U. Pratt,
Wood Planing Machine.
Nº 37,976. Patented Mar. 24, 1863.
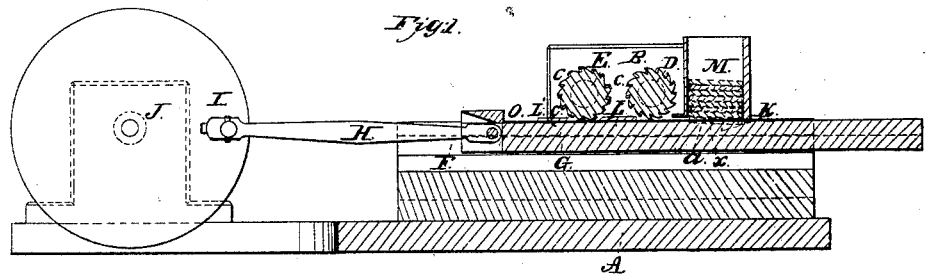
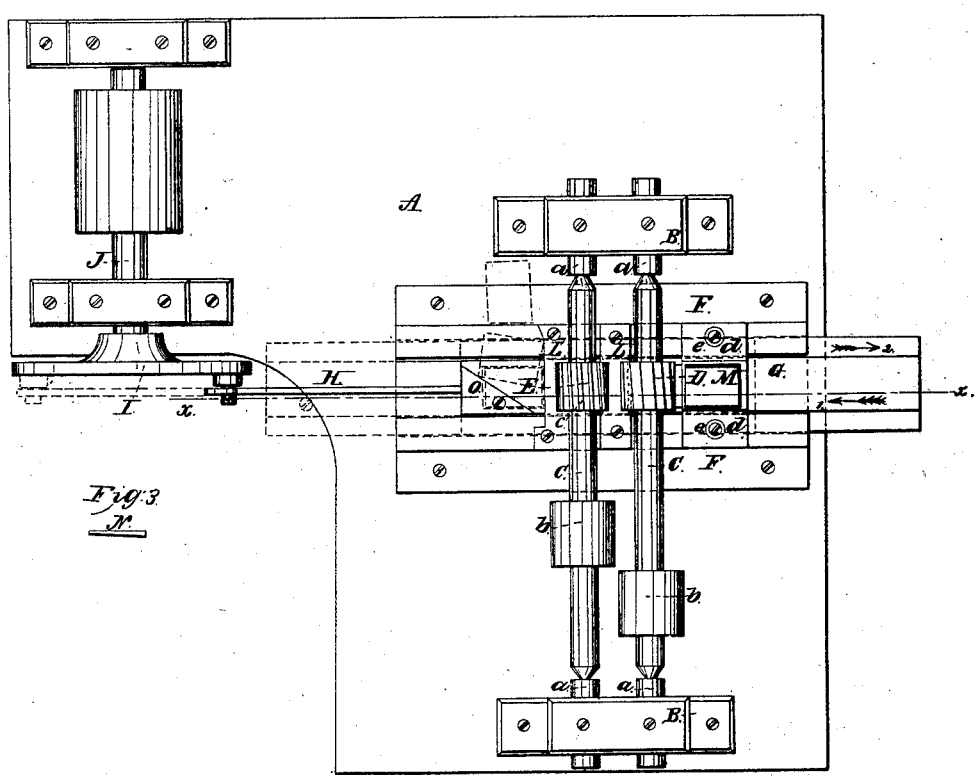

UNITED STATES PATENT OFFICE.

ULYSSES PRATT, OF DEEP RIVER, CONNECTICUT.

MACHINE FOR PLANING AND DRESSING IVORY.

Specification forming part of Letters Patent No. 37,976, dated March 24, 1863.

*To all whom it may concern:*

Be it known that I, ULYSSES PRATT, of Deep River, in the county of Middlesex and State of Connecticut, have invented a new and useful Machine for Planing and Dressing Ivory for Piano-Forte Keys; and I do hereby declare that the following is a full, clear, and exact description of the same, reference being had to the accompanying drawings, making a part of this specification, in which—

Figure 1 is a side sectional view of my invention, taken in the line $x\ x$, Fig. 2; Fig. 2, a plan or top view of the same; Fig. 3, a detached side view of a piece or slab of ivory dressed or finished by my invention.

Similar letters of reference indicate corresponding parts in the several figures.

The object of this invention is to obtain a machine of simple construction by which ivory slabs for piano-forte keys may be planed in proper form, and also roughened in order to admit of them being firmly secured to the keys.

To enable those skilled in the art to fully understand and construct my invention, I will proceed to describe it.

A represents a bed-piece on which the working parts of the machine are placed.

B B are two upright heads, which contain the centers $a\ a\ a\ a$ of two arbors, C C'. These arbors are allowed to rotate freely between their centers, and may be driven by gearing or by bands passing over pulleys $b\ b$. (See Fig. 2.) On the arbor C there is placed a cylinder of knives or cutters D. These knives or cutters have an oblique position on the cylinder, as shown in Fig. 2. On the arbor C' there is placed a cylinder, E, having its surface provided with a series of serrated cutters, $c$. These may be formed by serrating oblique projections on the periphery of the cylinder, or the cutter may be made of a series of saws placed together or with thin plates between them, the saws being firmly secured on their arbor. The object of this cylindrical cutter is to roughen the face of the work, and said cutter is in line with the cylindrical cutter D on arbor C.

F F represent two parallel ways or guides, which are secured on the bed-piece A at right angles to and underneath the arbors C C'. Between these ways or guides there is placed a sliding bed, G, which has a reciprocating motion imparted to it by means of a connecting-rod, H, attached to the crank-pulley I of a driving-shaft, J. The upper surface of the sliding bed G is flushed with the upper surface of the guides F F, and within the upper surface of the bed G there is made a recess, K, which has an inclined bottom, $a^x$, as shown in Fig. 1. To the upper surface of the guides F F there are attached transversely two metal plates, L L', one of which, L, is between the two cylindrical cutters, D E, and the other, L, at the outer side of the cutter E.

M is a hopper the lower part of which is provided with a flange, $d$, at each side, through which screws $e$ pass into the guides F F. This hopper M is of such dimensions internally that it will receive the ivory slabs N to be operated upon, and said hopper is directly over the bed G. The recess K is also of such dimensions that it will receive the slabs N one at a time, but it is not so deep as to receive the slabs entirely, as a portion of the upper parts of the same at the elevated end of the bottom of the recess will be above the level of the upper surface of the bed G, as shown in Fig. 1. To one end of the bed G, the end to which the connecting-rod H is attached, there is secured a triangular or wedge-shaped block, O, the use of which will be presently shown.

The operation is as follows: The slabs N are sawed off from a square block of ivory, the latter being previously sawed of the proper dimensions. The slabs are sawed transversly from this block and are placed in the hopper M, one directly over the other, as shown in Fig. 1. The shaft J and arbors C C' are rotated by any convenient power, and each time the bed G reaches the extent of its backward movement, which is indicated by the arrow 1, the recess K will be in line with or underneath the hopper M, and a slab, N, will drop into recess K. As the bed G moves forward, as indicated by the arrow 2, the slab N will be drawn underneath the rotary cutter D, and the latter will plane off the upper surface of the slab and give it a taper form in consequence of the slab being in an inclined position, which is due to the inclination of the bottom $a^x$ of the recess K. The slab then passes underneath the rotary cutter E, which roughens the upper surface of the slab, and the slab then passes underneath the plate L' and is beyond it when the bed G reaches the extent of its forward movement. The slab is now finished, and as the bed G moves backward in the direction of arrow 1, so that the recess K may pass underneath the hopper M to receive another slab, the finished slab is prevented from returning back with the bed G in consequence of coming in contact with the plate L'. The slab is consequently left upon the upper surface of the bed G, and just before the bed reaches the termination of its backward movement the block O comes in contact with the finished slab, and in consequence of its taper or wedge form throws it off from the bed G, as will be understood by referring to Fig. 2. The roughened surface of the slab is glued to the piano-forte key, and the object of roughening it is to cause it to be firmly connected to the keys. The under surfaces of the slabs when the latter are in the machine are the upper or face sides when the former are glued to the keys. The taper form is given the slabs in order that their front parts may be thicker than their back parts, as the former parts are subjected to the wear, the fingers of the player acting upon them. Durability, therefore, with economy in stock is obtained. I would remark that the bottom $a^\times$ of the recess K may be made adjustable in order to vary the thickness and taper of the slabs, as may be required.

I do not claim as new any feature pertaining to the slab when finished, as it is precisely the same as those now used; but I do claim as new and desire to secure by Letters Patent—

1. The combination of the rotary cutters D E and reciprocating bed G, the latter being provided with a recess, K, having an inclined bottom, $a^\times$, all arranged to operate as and for the purpose herein set forth.

2. The hopper M, in combination with the rotary cutters D E, reciprocating bed G, provided with the recess K, and the taper or wedge-shaped block O, all arranged substantially as and for the purpose herein specified.

ULYSSES PRATT.

Witnesses:
M. S. PARTRIDGE,
DANIEL ROBERTSON.